United States Patent [19]

Miller et al.

[11] 4,357,291

[45] Nov. 2, 1982

[54] DOUBLE METERING EXTRUDER SCREW AND METHOD OF EXTRUSION

[75] Inventors: John C. Miller, Piscataway; Archibald L. Burnett, Warren, both of N.J.

[73] Assignee: Union Carbide Corporation, Danbury, Conn.

[21] Appl. No.: 182,145

[22] Filed: Aug. 28, 1980

[51] Int. Cl.³ .............................................. B29B 1/06
[52] U.S. Cl. ............................. 264/176 R; 264/349; 366/79; 366/89; 425/208; 526/124
[58] Field of Search .......................... 264/349, 176 R; 425/208; 366/89, 79; 526/124, 125, 128

[56] References Cited

U.S. PATENT DOCUMENTS

| | | | |
|---|---|---|---|
| 2,702,410 | 2/1955 | Brown | 264/176 R |
| 3,300,810 | 1/1967 | Gregory et al. | |
| 3,496,603 | 2/1970 | Listner et al. | 425/208 |
| 3,712,776 | 1/1973 | Woodham et al. | 425/208 |
| 3,767,754 | 10/1973 | Manning et al. | 264/176 R |
| 3,862,265 | 1/1975 | Steinkamp et al. | 264/176 R |
| 3,905,588 | 9/1975 | Reinhart . | |
| 4,129,386 | 12/1978 | Rauwendaal | 425/208 |
| 4,267,146 | 5/1981 | Kurtz et al. | 425/461 |
| 4,282,177 | 8/1981 | Kurtz et al. | 264/209.1 |

Primary Examiner—Jeffery R. Thurlow
Attorney, Agent, or Firm—C. J. Vicari; R. C. Brown

[57] ABSTRACT

A high output extruder screw which produces throughputs at lower temperatures and lower specific energy input. The screw has a feed section, a first short transition section, a first metering section, a second short transition section and a second metering section wherein the screw diameter increases from the feed section to the second metering section. There is also provided a method for extruding specific ethylene polymers.

11 Claims, 1 Drawing Figure

U.S. Patent     Nov. 2, 1982     4,357,291
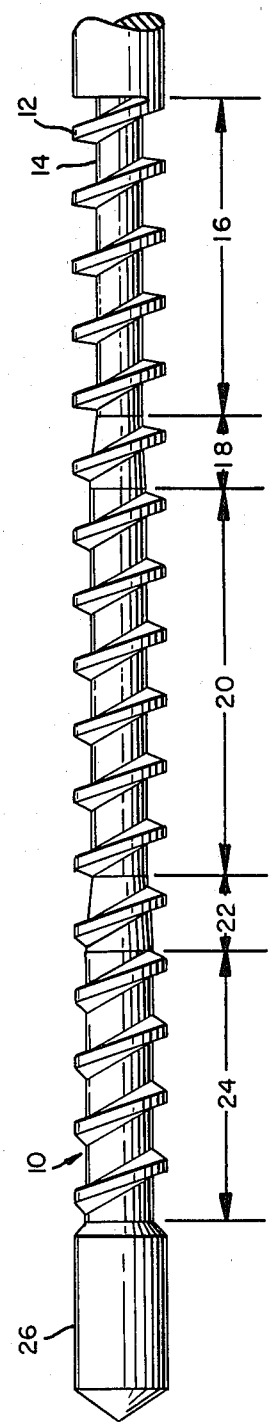

DOUBLE METERING EXTRUDER SCREW AND METHOD OF EXTRUSION

FIELD OF THE INVENTION

This invention relates to an apparatus and method for extruding molten narrow molecular weight distribution, linear, ethylene polymers.

BACKGROUND OF THE INVENTION

Conventional low density polyethylene has been historically polymerized in heavy walled autoclaves or tubular reactors at pressures as high as 50,000 psi and temperatures up to 300° C. The molecular structure of high pressure, low density polyethylene (HP-LDPE) is highly complex. The permutations in the arrangement of their simple building blocks are essentially infinite. HP-LDPE's are characterized by an intricate long chain branched molecular architecture. These long chain branches have a dramatic effect on the melt rheology of these resins. HP-LDPE's also possess a spectrum of short chain branches, generally 1 to 6 carbon atoms in length. These short chain branches disrupt crystal formation and depress resin density.

With recent developments in low pressure technology, low density narrow molecular weight distribution linear ethylene polymers can now be produced at low pressures and temperatures by copolymerizing ethylene with various alphaolefins. These low pressure LDPE (LP-LDPE) resins generally possess little, if any, long chain branching. They are short chain branched with branch length and frequency controlled by the type and amount of comonomer used during polymerization.

U.S. Pat. No. 4,302,566 issued on Jan. 24, 1981 discloses that ethylene copolymers, having a density of 0.91 to 0.96, a melt flow ratio of $\geq 22$ to $\leq$ and a relatively low residual catalyst content can be produced in granular form, at relatively high productivities if the monomer(s) are copolymerized in a gas phase process with a specific high activity Mg-Ti containing complex catalyst which is blended with an inert carrier material.

U.S. Pat. No. 4,302,565 discloses that ethylene copolymers, having a density of 0.91 to 0.96, a melt flow ratio of $\geq 22$ to $\leq 32$ and a relatively low residual catalyst content can be produced in granular form, at relatively high productivities, if the monomer(s) are copolymerized in a gas phase process with a specific high-activity Mg-Ti containing complex catalyst which is impregnated in a porous inert carrier material.

U.S. patent application Ser. No. 892,037 filed Mar. 31, 1978, abandoned and refiled as Ser. No. 014,412 on Feb. 27, 1979 now abandoned, in the names of B. E. Wagner et al and entitled Polymerization Catalyst, Process For Preparing And Use For Ethylene Homopolymerization, and which corresponds to European Patent Application No. 79100957.4 which was published as Publication No. 004,646 on Oct. 17, 1979, discloses that ethylene homopolymers having a density of about $\geq 0.958$ to $\leq 0.972$ and a melt flow ratio of about $\geq 22$ to about $\leq 32$ which have a relatively low residual catalyst residue can be produced at relatively high productivities for commercial purposes by a low pressure gas phase process if the ethylene is homopolymerized in the presence of a high-activity Mg-Ti-containing complex catalyst which is blended with an inert carrier material. The granular polymers thus produced are useful for a variety of end-use applications.

The polymers are produced, for example, by the processes of said applications using the Mg-Ti containing complex catalyst possess a narrow molecular weight distribution, Mw/Mn, of about $\geq 2.7$ to $\leq 4.1$.

Over the years, film extrusion equipment has been optimized for the rheology of HP-LDPE. The different molecular architecture of low pressure-low density polyethylene (LP-LDPE) result in a film processing behavior which requires different extrusion parameters. By way of background, conventional extruders commonly used for HP-LDPE include an elongated barrel which may be heated or cooled at various locations along its length and a screw which extends longitudinally through the barrel. The screw has a helical land on its surface which cooperates with the cylindrical internal surface of the barrel to define an elongated helical channel. Although the pitch of the screw may vary along the length thereof, it is common at the present time to utilize screws of constant pitch wherein the pitch is "square", that is, where the distance between adjacent flights is equal to the diameter. The screw is rotated about its own axis to work the plastic material and feed it toward the outlet end of the barrel.

An extruder screw ordinarily has a plurality of sections which are of configuration specially suited to the attainment of particular functions. Examples are "feed" sections and "metering" sections, which are of basic importance and are present in nearly all extruders for handling thermoplastic polymers.

A typical extruder screw feed section extends beneath and forwardly from a feed opening where polymer in pellet or powder form is introduced into the extruder to be carried forward along the inside of the barrel by the feed section of the screw. In this section the channel depth of the screw is usually large enough to over-feed the solid polymer. This is a desirable effect because the over-feeding action serves to compact and pressurize the polymer particles and form a solid bed of advancing material.

The working of the material generates heat, and melting of the polymer proceeds as the material is moved along the feed section of the screw. Actually, most of the melting occurs near the barrel surface at the interface between a thin melt film and the solid bed of polymer. This general pattern persists until a substantial portion of the polymer reaches the melted state. After some 40 to 70 percent of the polymer has been melted, solid bed breakup usually occurs, and at this time particles of solid polymer become dispersed in the polymer melt. From this point on, it often is advantageous to intimately mix the polymer melt with the unmelted material to accelerate melting and minimize local nonuniformities.

An extruder screw "metering" section has as its special function the exertion of a pumping action on the molten polymer. Ordinarily the throughput achieved by a screw is thought of as being a function of the combination of the "drag flow" and "pressure flow" effects of the metering section.

Drag flow is basically the flow which results from the relative movement between the screw and the internal surface of the extruder barrel. It may be thought of as being proportional to the product of the average relative velocity and the channel cross-sectional area. This drag flow component is directed toward the outlet end of the screw. It may be increased by increasing the speed of the screw and/or by increasing the depth of the flow channel in the screw.

Acting in opposition to drag flow is a pressure flow component stemming from the reluctance of the material to flow through the restricted outlet opening at the end of the extruder passage. The speed of the screw does not directly affect the pressure flow component but of course it may affect such factors as back pressure and material viscosity, which factors, in turn, affect significantly the pressure flow component. On the other hand pressure flow is directly affected by both the depth and length of the screw channel; an increase in channel depth has a tendency to increase greatly the pressure flow component and an increase in channel length has a tendency to reduce this back flow component.

In addition to the basic "feed" and "metering" sections an extruder screw also may include a number of other distinct sections. Nearly all screws include, for example so-called "transition" sections.

Over the years there has been a trend toward the use of extruders capable of high outputs. In many applications, various economies in production are possible where high extruder outputs can be obtained on a reliable basis.

Although LP-LDPE resins can be extruded on equipment designed for HP-LDPE resins, such as described above, certain equipment modifications are often required in order to extrude the low pressure resins at optimum conditions and at rates comparable to the high pressure resins. This is particularly true during extrusion of LP-LDPE which is subsequently processed into film. The problem appears to be that when the new low pressure resins are extruded through equipment with screws designed for the earlier high pressure resin pellets, they suffer from the effects of high exit temperatures, decreased energy efficiency and reduced outputs due to power limitations.

Accordingly, present extruder screws and methods for extruding LP-LDPE resins are not entirely satisfactory from a practical commercial standpoint and there currently exists a need for providing an extrusion screw and an extrusion method which provides high output rates.

SUMMARY OF THE INVENTION

It is the general object of this invention to provide an improved method for dealing with problems of the types mentioned above.

Another object of this invention is to provide a method for achieving good extrudate metering performance at high rates.

A still further object is to provide a novel extruder screw, which can be used with conventional extruder apparatus to extrude low density narrow molecular weight distribution, linear, ethylene polymers.

These and other objects are achieved by a novel method for extruding low density narrow molecular weight distribution, linear, ethylene polymers which comprises introducing said granular polymers into an extruder apparatus having an extruder screw having a helical feed flight of constant pitch and including a feed zone comprising a constant screw root diameter; thence passing said polymers through a first short transition zone of said screw wherein the screw root diameter increases; thence passing said polymers through a first metering zone of said screw having a constant screw root diameter greater than the screw root diameter in said feed zone; continuing passage of said polymer into and through a second short transition zone wherein the screw root diameter increases; and thence passing said polymer into and through a second metering zone having a constant diameter greater than the screw root diameter in said first metering zone.

The present invention also provides a novel extruder screw for extruding low density narrow molecular weight distribution linear ethylene polymers which comprises:

a screw root and a helical feed flight of constant pitch;

a feed section wherein said screw root diameter is constant;

a first short transition section having at least one-half turn of said helical feed flight and wherein said screw root has an increasing diameter and is larger than the diameter in said feed section;

a first metering section wherein said screw root has a constant screw root diameter greater than the screw root diameter in said feed and first short transition sections;

a second short transition section having at least about one-half turn of said helical flight and wherein said screw root diameter is larger than the diameter of the screw root in said first metering section; and a second metering section wherein said screw has a constant screw root diameter greater than the screw root diameter in said first metering section.

A more complete understanding of these and other features and advantages of the invention will be gained from a consideration of the following description of certain embodiments illustrated in the accompanying drawing.

BRIEF DESCRIPTION OF THE DRAWING

The sole FIGURE in the drawing is an elevational view of the extruder screw of the present invention.

DETAILED DESCRIPTION OF THE PREFERRED EMBODIMENTS

Although the drawing only illustrates the novel extruder screw for purposes of practicing the method of the present invention, it will be understood that the extruder screw is utilized in its normal environment, i.e. in cooperative association with conventional frame means, a horizontally extending barrel, feed and hopper means and a drive means all of which are not shown since, as mentioned previously, they constitute well-known apparatus commercially available to the art. Merely as illustrative, the extruder screw can be mounted in the apparatus enclosed in U.S. Pat. Nos. 4,155,655 and 4,053,143.

The screw 10, as shown, is a single stage screw, having a helical flight 12 of constant outside diameter and includes a screw root 14, a feed section 16, a first short transition section 18, a first metering section 20, a second short transition section 22, a second metering section 24 and a conventional mixing section 26 which can be associated with the screw 10.

The feed section 16 receives the designated ethylene polymer for plastication and extrusion in the apparatus. In this section, the radius of the screw root 14 is smaller than the radius of the screw root in all subsequent sections, as shown in the drawing. Thus, the depth of the material channel between the screw root and the inner cylindrical surface of the barrel of the extruder (not shown) is larger than in all subsequent sections. The deep channel depth gives the feed section of the screw a high material delivery rate and causes the particles or pellets of solid polymer to be compacted and compressed. The turning of the screw works the solid bed of plastic to generate heat which serves to melt the solid material.

The feed section 16 is shown in the drawing as having a length of about 6.5 times the nominal screw diameter. In this section the depth of the material channel is substantially constant.

Downstream from the feed section 16 is a so-called first short transition section 18 shown in the drawing as having a length constituting at least about one-half turn of helical flight 12. In this section the radius of the screw root is increased so that the helical polymer channel becomes progressively shallower. The melting of the material continues as it moves into the transition section 18. This melting takes place for the most part in an interface between a film of molten polymer and a solid bed of packed particle polymers. As the melting continues, however, a point is reached where the solid bed breaks up and small particles of solid polymer become dispersed in the body of a molten polymer.

Situated adjacent the first short transition section 18 in the direction toward the exit end of the screw 10 is a first metering section 20. It will be seen that in this section the diameter or radius of the screw root remains constant and is greater than the diameter of radius of the screw root in the feed section 16 and first short transition section 18. Moreover, although the first metering section is shown as having a length of about 6 times the nominal diameter, it will be understood that the length can be lesser or greater depending upon the length of the screw.

Under conventional methods for producing HP-LDPE there is generally utilized an extruder screw having these basic sections, i.e., a feed section, a transition section and a metering section. In the processing of the LP-LDPE granular resins of the instant invention, however, problems occur utilizing these basic sections because of high exit temperatures, decreased energy efficiency and low output rates. It was found that these problems could be overcome by including a second short transition section after the first metering section followed by second metering section of specified configuration. Hence, referring again to the drawing, it will be seen that following the first metering section 20 is a second short transition section 22.

In this section, the radius or diameter of the screw root is again gradually increased so that the helical polymer channel becomes progressively narrower. As shown in the drawing, the length of the second short transition section 22 constitutes above one-half turn of the helical flight 12 but can as will be appreciated be of greater length, i.e., in excess of about one-half turn, depending on the length of the screw.

The second short transition section 22 leads into a second metering section 24. It will be noted that in this section, the diameter of the screw root remains constant and is greater than the diameter of the screw root in all previous sections and particularly in the feed section 16 and first short transition section 18.

Moreover, from the drawing, it will be seen that the metering section has a length of about 3-4 times the nominal diameter of the screw although as will be understood, the length can be lesser or greater depending on the total length of the screw.

Additionally, the screw may also include a conventional mixer device at the end of the second metering section 24 such as mixer 26.

The specific dimensions for the screw designed in accordance with the principles of this invention may be determined empirically, calculated using conventional equations, or determined by the use of commercially available computer programs.

The ethylene polymers which may be used in the process of the present invention are homopolymers of ethylene or copolymers of a major mol percent ($\geq 90\%$) of ethylene, and a minor mol percent ($\leq 10\%$) of one or more $C_3$ to $C_8$ alpha olefins. The $C_3$ to $C_8$ alpha olefins should not contain any branching on any of their carbon atoms which is closer than the fourth carbon atom. The preferred $C_3$ to $C_8$ alpha olefins are propylene, butene-1, pentene-1, hexene-1 and octene-1.

The ethylene polymers have a melt flow ratio of $\geq 18$ to $\leq 32$, and preferably of $\geq 22$ to $\leq 32$. The melt flow ratio value is another means of indicating the molecular weight distribution of a polymer. The melt flow ratio (MFR) range of $\geq 22$ to $\leq 32$ thus corresponds to a Mw/Mn value range of about 2.7 to 4.1. The polymers herein include a Mw/Mn value in the range of about 2.2 to 4.1.

The homopolymers have a density of about $\geq 0.958$ to $\leq 0.972$ and preferably of about $\leq 0.961$ to $\geq 0.968$.

The copolymers have a density of about $\geq 0.91$ to $\leq 0.96$ and preferably $\leq 0.917$ to $\geq 0.955$, and most preferably, of about $\geq 0.917$ to $\leq 0.935$. The density of the copolymer, at a given melt index level for the copolymer, is primarily regulated by the amount of the $C_3$ to $C_8$ comonomer which is copolymerized with the ethylene. In the absence of the comonomer, the ethylene would homopolymerize with the catalyst of the present invention to provide homopolymers having a density of about $\geq 0.96$. Thus, the addition of progressively larger amounts of the comonomers to the copolymers results in a progressive lowering of the density of the copolymer. The amount of each of the various $C_3$ to $C_8$ comonomers needed to achieve the same result will vary from monomer to monomer, under the same reaction conditions.

Thus, to achieve the same results, in the copolymers, in terms of a given density, at a given melt index level, larger molar amounts of the different comonomers would be needed in the order of $C_3 > C_4 > C_5 > C_6 > C_7 > C_8$.

The melt index of a homopolymer or copolymer is a reflection of its molecular weight. Polymers having a relatively high molecular weight, have a relatively low melt index. Ultra-high molecular weight ethylene polymers having a high load (HLMI) melt index of about 0.0 and a very high molecular weight ethylene polymers have a high load melt index (HLMI) of about 0.0 to about 1.0. The polymers of the present invention have a standard or normal load melt index of $\geq 0.0$ to about 50, and preferably of about 0.5 to 35, and a high load melt index (HLMI) of about 11 to about 950. The melt index of the polymers which are used in the process of the present invention is a function of a combination of the polymerization temperature of the reaction, the density of the copolymer and the hydrogen/monomer ratio in the reaction system. Thus, the melt index is raised by increasing the polymerization temperature and/or by decreasing the density of the polymer and/or by increasing the hydrogen/monomer ratio.

The ethylene polymers of the present invention have an unsaturated group content of $\leq 1$, and usually $\geq 0.1$ to $\leq 0.3$, $C=C/1000$ carbon atoms, and a cyclohexane extractables content of less than about 3, and preferably less than about 2, weight percent.

The ethylene polymers of the present invention have a residual catalyst content, in terms of parts per million of titanium metal, of the order of $\leq 20$ parts per million, (ppm) at a productivity level of $\geq 50,000$, and of the order of $\leq 10$ ppm at a productivity level of $\geq 100,000$ and of the order of $\leq 3$ parts per million at a productivity level of $\geq 300,000$. Where the polymers are made with halogen containing catalysts wherein the halogen is chlorine, the polymers have a Cl residue content of $\leq 140$ ppm at a productivity of $\geq 50,000$, a Cl content of $\leq 70$ ppm at a productivity of $\geq 100,000$, and a Cl content $\leq 21$ ppm at a productivity of $\geq 300,000$. The ethylene polymers are readily produced at productivities of up to about 300,000.

The polymers processed in the present invention are produced as granular materials which have an average particle size of the order of about 0.005 to about 0.06 inches, and preferably of about 0.02 to about 0.04 inches, in diameter. The particle size is important for the purposes of readily fluidizing the polymer particles in the fluid bed reactor, as described below. The polymers of the present invention have a settled bulk density of about 15 to 32 pounds per cubic foot.

The homopolymers and copolymers of the present invention are useful for making film.

For film making purposes the preferred copolymers of the present invention are those having a density of about $\geq 0.917$ to $\leq 0.924$; a molecular weight distribution (Mw/Mn) of $\geq 2.7$ to $\leq 3.6$, and preferably of about $\geq 2.8$ to 3.1; and a standard melt index of $\geq 0.5$ to $\leq 5.0$ and preferably of about $\geq 1.0$ to $\leq 4.0$. The films have a thickness of $>0$ to $\leq 10$ mils and preferably of $>0$ to $\leq 5$ mils.

Having set forth the general nature of the invention, the following examples illustrate some specific embodiments of the invention. It is to be understood, however, that this invention is not limited to the examples, since the invention may be practiced by the use of various modifications.

EXAMPLES

A conventional extruder screw was evaluated and compared with the extruder screw of the instant invention. Both screws were contained in a conventional extruder built to substantially industry practice. The polymer extruded was an ethylene-butene copolymer which is available from Union Carbide Corporation under the trade name designation GRSN 7040. The copolymer had the following nominal properties:

Density: 0.918 gms/cc
Melt Index: 2.0 gms/10 minutes
Melt Flow Ratio: 27
Bulk Density: 27 lbs/ft.$^3$ Both extruder screws had a nominal outside diameter of 2.5 inches. The conventional screw had the following characteristics:

|  | Flight | Lead | Depth | Flight | Lead | Depth |  |
|---|---|---|---|---|---|---|---|
|  | 1 | 2.5 | .450 | 9 | 2.5 | .150 |  |
|  | 2 | 2.5 | .450 | 10 | 2.5 | .150 |  |
| 5 L/D Feed | 3 | 2.5 | .450 | 11 | 2.5 | .150 |  |
| Section | 4 | 2.5 | .450 | 12 | 2.5 | .150 | 8.4 L/D |
|  | 5 | 2.5 | .450 | 13 | 2.5 | .150 | Metering |
| 3 L/D Transition | 6 | 2.5 | .366 | 14 | 2.5 | .150 | Section |
| sition | 7 | 2.5 | .257 | 15 | 2.5 | .150 |  |
| Section | 8 | 2.5 | .164 | 16 | 2.5 | .150 |  |

Flighted length of screw is 41" (16.4 L/D) + 2 L/D Fluted mixing section
Length of screw and mixing head was 46 inches The screw of the instant invention had the following characteristics:

| Flight | Lead | Depth |  |
|---|---|---|---|
| 1 | 2.5 | .400 |  |
| 2 | ↓ | .400 |  |
| 3 | ↓ | .400 |  |
| 4 | ↓ | .400 | 7 L/D Feed Section |
| 5 | ↓ | .400 |  |
| 6 | ↓ | .400 |  |
| First Transition | ↓ | Variable |  |
| 7 | ↓ | .260 |  |
| 8 | ↓ | .260 |  |
| 9 | ↓ | .260 | 6 L/D First Meter Section |
| 10 | ↓ | .260 |  |
| 11 | ↓ | .260 |  |
| 12 | ↓ | .260 |  |
| Second Transition | ↓ | Variable |  |
| 13 | ↓ | .150 |  |
| 14 | ↓ | .150 | 3 L/D Section Meter Section |
| 15 | ↓ | .150 |  |
| 16 | ↓ | .150 |  |

Flighted length was 41"

Table I illustrates the operating conditions and a comparison of a screw in accordance with the instant invention with a conventional simple screw with a feed, transition and metering section.

The transition sections are located at 16.5" for the first transition section and the second section at 31.5" (flighted length).

TABLE I

| Comparison of Extrusion Behavior | | |
|---|---|---|
| Conventional Screw | | Double Metering |
| Screw Speed (RPM) | 100 | 100 |
| Head Pressure: (psi) | 4500 | 4600 |
| Output (lbs/nr) | 165 | 181 |
| Exit Temperature (°F.) | 415 | 376 |
| *SEI (HP-hr/lb) | .16 | .15 |
| Power (H.P.) | 26 | 27 |

*SEI = Specific Energy Input

As will be seen from the foregoing, the output of the extruder screw of the instant invention is increased at the same screw speed and pressure as compared to the conventional screw. Advantageously exit temperature is decreased at the same screw speed and pressure utilizing the novel screw configuration. Moreover SEI (specific energy input) is decreased utilizing the novel screw of the instant invention. As is known SEI is considered an energy efficiency term for extruders.

It is to be understood that the above-described embodiments of the invention are merely illustrative of applications of the principles of this invention and that numerous other arrangements and modifications may be made within the spirit and scope of the invention.

What is claimed is:

1. An extruder screw for extruding low density narrow molecular weight distribution linear ethylene polymers which comprises:
    a screw root and a helical feed flight of constant pitch;
    a feed section wherein said screw root diameter is constant;
    a first short transition section having at least about one-half turn of said helical feed flight and wherein said screw root has an increasing diameter and is larger than the diameter in said feed section;
    a first metering section wherein said screw root has a constant screw root diameter greater than the screw root diameter in said feed and first short transition sections;
    a second short transition section having at least about one-half turn of said helical flight and wherein said screw root diameter is larger than the diameter of the screw root in said first metering section; and
    a second metering section wherein said screw has a constant screw root diameter greater than the screw root diameter in said first metering section.

2. An extruder screw according to claim 1 further including a mixing section associated with said second metering section.

3. An extruder screw according to claim 1 wherein said feed section has a length of about 6.5 times the nominal screw diameter.

4. An extruder screw according to claims 1 or 3 wherein said first metering section has a length of about 6 times the nominal screw diameter.

5. An extruder screw according to claim 4 wherein said second metering section has a length of about 3-4 times the nominal screw diameter.

6. A method for extruding low density narrow molecular weight distribution, linear, ethylene polymers which comprises introducing said granular polymers into an extruder apparatus having an extruder screw having a helical feed flight of constant pitch and including a feed zone comprising a constant screw root diameter; thence passing said polymers through a first short transition zone of said screw wherein the screw root diameter increases; thence passing said polymers through a first metering zone of said screw having a constant screw root diameter greater than the screw root diameter in said feed zone; continuing passage of said polymer into and through a second short transition zone wherein the screw root diameter increases; and thence passing said polymer into and through a second metering zone having a constant screw root diameter greater than the screw root diameter in said first metering zone.

7. A method according to claim 6 wherein said polymer leaving said second metering zone is introduced into a mixing zone associated with said second metering zone.

8. A method according to claim 7 in which said polymer is a copolymer of ethylene and at least one $C_3$ to $C_8$ alpha olefin having a melt index of about $\geq 0.1$ to about $\leq 20$.

9. A method according to claim 8 in which said polymer is a copolymer of $\geq 90$ mol percent ethylene and $\leq 10$ mol percent of at least one $C_3$ to $C_8$ alpha olefin.

10. A method according to claim 9 in which said copolymer has a molecular weight distribution of about $\geq 2.7$ to $\leq 6.0$ and a total unsaturation content of about $\geq 0.1$ to $\leq 0.3$ C=C/1000 C atoms.

11. A method according to claim 9 in which said copolymer has a melt flow ratio of about $\geq 22$ to $\leq 40$ and a total unsaturation content of about $\geq 0.1$ to $\leq 0.3$ C=C/1000 C atoms.

* * * * *